United States Patent
Kraeling et al.

(10) Patent No.: US 9,656,680 B2
(45) Date of Patent: *May 23, 2017

(54) SYSTEM AND METHOD FOR DETERMINING ORDER OF VEHICLES

(71) Applicant: General Electric Company, Schenectady, NY (US)

(72) Inventors: Mark Bradshaw Kraeling, Melbourne, FL (US); Todd William Goodermuth, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,089

(22) Filed: Jul. 19, 2015

(65) Prior Publication Data

US 2015/0321683 A1 Nov. 12, 2015

Related U.S. Application Data

(63) Continuation of application No. 13/741,649, filed on Jan. 15, 2013, now Pat. No. 9,114,817.

(51) Int. Cl.
*B61L 23/34* (2006.01)
*B61L 25/02* (2006.01)
*H04L 29/08* (2006.01)
*H04L 12/26* (2006.01)

(52) U.S. Cl.
CPC ............ *B61L 25/028* (2013.01); *B61L 23/34* (2013.01); *H04L 43/0888* (2013.01); *H04L 67/10* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 2005/0143874 A1* | 6/2005 | Peltz | B61L 3/125 701/19 |
| 2006/0224309 A1* | 10/2006 | Schmidt | G05D 1/028 701/509 |
| 2011/0320071 A1* | 12/2011 | Karg | B61L 25/028 701/19 |
| 2012/0317282 A1* | 12/2012 | Kraeling | H04L 12/40 709/224 |
| 2014/0136031 A1* | 5/2014 | Burnett | B61C 17/12 701/19 |

* cited by examiner

*Primary Examiner* — Rami Khatib
*Assistant Examiner* — Gerrad A Foster
(74) *Attorney, Agent, or Firm* — John A. Kramer; Global Patent Operation (57) ABSTRACT

A system includes a first communication module and a first ordering determination module. The first communication module is configured to be disposed onboard a first vehicle of a vehicle consist and to communicate individual messages that are targeted for communication with respective individual second vehicles of the vehicle consist. The first ordering determination module is configured to be disposed onboard the first vehicle of the vehicle consist, and to determine an order of the first vehicle and one or more of the second vehicles in the consist using message characteristic information. The message characteristic information corresponds to a transmission characteristic of the individual messages.

22 Claims, 4 Drawing Sheets

SYSTEM AND METHOD FOR DETERMINING ORDER OF VEHICLES

CROSS-REFERENCE TO RELATED APPLICATIONS

This application is a continuation of U.S. application Ser. No. 13/741,649, filed Jan. 15, 2013.

FIELD

Embodiments of the subject matter described herein relate to determining the order of vehicles in a system, for example, autonomously determining the order of propulsion-generating units in a vehicle consist.

BACKGROUND

A vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a rail vehicle system (e.g., train) may include a powered unit consist that has one or more powered units (e.g., locomotives) mechanically coupled to one another; the powered unit consist may in turn be coupled to one or more rail cars. Vehicles in a single consist may include a lead powered unit and one or more remote powered units. The lead vehicle may control operation of one or more remote vehicles. More specifically, the lead vehicle (e.g., a lead locomotive) may coordinate tractive and braking operations of the different powered units (e.g., remote or trail locomotives) to control movement of the rail vehicle consist (e.g., a train). In some cases, a single train may include a plurality of such locomotive consists. The locomotive consists may communicate with one another to coordinate tractive and braking operations of the train.

In certain conventional vehicle systems, the order of powered vehicles in a given consist may not be known or easily obtainable. Further, to the extent ordering information may be entered by an operator, such information is prone to operator error, and may be incorrectly entered.

These and other drawbacks of conventional powered units of a consist may result in limited adjustability and/or fine tuning of control of plural powered units, difficulty in troubleshooting and/or adjusting for changes in status of one or more vehicles, and the like.

BRIEF DESCRIPTION

In one embodiment, a system is provided that includes a first communication module and a first ordering determination module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

The first communication module is configured to be disposed onboard a first vehicle of a vehicle consist and to communicate individual messages that are targeted for communication with respective individual second vehicles of the vehicle consist. The first ordering determination module is configured to be disposed onboard the first vehicle of the vehicle consist, and to determine an order of the first vehicle and one or more of the second vehicles in the consist using message characteristic information. The message characteristic information corresponds to one or more transmission characteristics of the individual messages.

In another embodiment, a method (e.g., a method for determining the order of plural vehicles in a consist) is provided that includes sending, from a first communication module disposed onboard a first vehicle of a vehicle consist, plural first individual messages to corresponding plural second vehicles of the vehicle consist. The method also includes determining first message characteristic information corresponding to the second vehicles receiving the first individual messages. The method also includes determining, at an ordering determination module disposed onboard the first vehicle, a vehicle order of the consist using the first message characteristic information.

In another embodiment, a tangible and non-transitory computer readable medium is provided that includes one or more computer software modules configured to direct a processor to send, from a first communication module disposed onboard a first vehicle of a vehicle consist, plural first individual messages to corresponding plural second vehicles of the vehicle consist. The one or more computer software modules are also configured to direct the processor to determine first message characteristic information corresponding to the second vehicles receiving the first individual messages. The one or more computer software modules are also configured to direct the processor to determine, at the first vehicle, a vehicle order of the consist using the first message characteristic information.

BRIEF DESCRIPTION OF THE DRAWINGS

The inventive subject matter will be better understood from reading the following description of non-limiting embodiments, with reference to the attached drawings, wherein below.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry.

Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

Throughout this document, the term vehicle consist is used. A vehicle consist can be a group of two or more vehicles that are mechanically coupled to travel together along a route. Optionally, a vehicle consist may have a single propulsion-generating unit or vehicle. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with no other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

One or more embodiments of the inventive subject matter described herein relate to methods and systems for communicating data in a vehicle system. The vehicle system may include a plurality of vehicles that are mechanically coupled or linked together (directly or indirectly) and communicatively coupled to each other. Each of the vehicles may have a corresponding vehicle network. One or more characteristics of messages sent between particular vehicles of the vehicle system may be measured or otherwise identified and used to determine distance information for various vehicle pairs throughout the consist (e.g., information corresponding to distance between two vehicles). The distance information may then be used to determine the order of the vehicles along a length of the consist.

Multiple unit (MU) cable connections between powered rail vehicles may carry signals for throttle, dynamic brake, direction, and the like. Particular vehicles may include identification numbers or labels that may be used to communicate specific individual messages to a corresponding desired vehicle. However, such communication systems may not include ordering information identifying the position of the particular vehicle within a consist. For example, a message may be communicated for receipt by a particular target vehicle (e.g., by overlaying a digital MU path over one or more wires of a MU cable, such as Ethernet over MU (eMU)) that provides for messages to be specific for a given vehicle.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

The data communicated between the vehicles may be network data. In some embodiments, "network data" includes data packets that are configured in a designated packet format. For example, data may be packaged into a data packet that includes a set of data bits that are arranged to form a control portion and a payload portion. The control portion of the data bits may correspond to addresses (e.g., source, destination), error detection codes (e.g., checksums), and sequencing information (e.g., timing information). The control portion may be found in packet headers and trailers of the corresponding data packet. The payload portion of the data bits may correspond to the information that was requested and/or is used by the vehicle system for a designated purpose, such as for making operational decisions and/or for controlling operations (e.g., tractive efforts, braking efforts, and the like) of the vehicle system. The payload portion may include operating data. Operating data may include different types of data from various components of a vehicle system that are used to control operation of the vehicle system. For example, the operating data may include information from sensors that indicates a performance level or state of a component of the vehicle system. For instance, fuel sensors may be configured to transmit signals that are indicative of a current fuel level or current fuel efficiency. In rail vehicle systems, sensors coupled to the engine or motors may transmit data that indicates a notch (or throttle) level of the rail vehicle system. Sensors may also be coupled to various elements of mechanical systems (e.g., motors, engines, braking systems) and transmit signals indicating when a corresponding element is properly operating or has failed. Operating data may also include information from data radios and global positioning system (GPS) units. GPS units may transmit information describing or indicating a position of the vehicle system. Data radios may transmit information regarding one or more different vehicles of the vehicle system. In various embodiments, the payload portion may be configured (e.g., sized) to determine a message characteristic, such as a rate of communication between two vehicles of a consist. In some embodiments, the payload portion of a packet may not include operating information, but instead be used solely for determining a communication characteristic, such as a rate of communication.

With respect to the network data, the data packets may be packaged and communicated in accordance with a designated communications protocol. The designated communications protocol may include predetermined rules and formats for exchanging data packets between nodes or computing systems. Various communications protocols may be used for embodiments described herein including, but not limited to, an industry standard communications protocol, a proprietary communications protocol, and/or an open-source or publicly available communications protocol. In some embodiments, the data packets are packaged and communicated according to an Internet-layer type protocol for packet-switched internetworking. For example, the data packets may be packaged and communicated in accordance with Internet Protocol version 6 (IPv6) or in accordance with Internet Protocol version 4 (IPv4). Alternatively or additionally, the data packets may be packaged and/or communicated in accordance with another IP protocol version or another protocol. Network data may be generally configured for the Internet protocol suite, which may be referred to as TCP/IP due to the Internet protocol suite including the Transmission Control Protocol (TCP) and Internet Protocol (IP). Network data may also be configured according to the Session Initiated Protocol (SIP). Other communications protocols, however, exist and may be used by alternative embodiments.

At least one technical effect of various embodiments described herein may include improved tailoring of commands for individual vehicles of a consist. For example, the use of ordering information may be used to tailor commands based on the position of a vehicle within a consist. Another technical effect may include improved redundancy or robustness of information collection or sensing. For example, the use of ordering information may be used to identify vehicles particularly well suited to supplement or replace information collected onboard a given vehicle, such as vehicles that are adjacent or nearby the given vehicle. Another technical effect may include providing a convenient technique for retro-fitting existing vehicles to determine vehicle ordering information.

Generally speaking, in embodiments of the present inventive subject matter, message communication characteristics may be determined for paths or tunnels communicatively connecting vehicle pairs of a consist. In some embodiments, a rate of communication may be determined for communications between each pair of vehicles in a consist. For example, for a consist including vehicles A, B, and C, communication rates may be determined for each pairing (e.g., a first communication rate between vehicles A and B, a second communication rate between vehicles A and C, a third communication rate between vehicles B and C). In some embodiments, rates may be determined in both directions (e.g., a rate for communications from A to B and a separately determined rate for communications from B to A). The message characteristic information may then be compared to determine distances between particular vehicles, and used, in combination with information identifying the forward most vehicle of the consist, to determine an order of vehicles in the consist.

In some embodiments, to address potential uncertainty due to transient fluctuations in one or more communication rates, average communication rates (or other message characteristic information) may be determined. Additionally or alternatively, message characteristic information may be determined through the use of messages sent substantially simultaneously (e.g., messages sent at or near the same point in time or over essentially the same period of time) or concurrently (e.g., messages sent over overlapping time periods). In some embodiments, plural vehicles of a consist may determine ordering information (e.g., information describing, depicting or corresponding to an order of vehicles or to distances of vehicles relative to the vehicle at which the determination is made), and communicate the determined ordering information to a lead or otherwise designated vehicle, with the lead or otherwise designated vehicle using the information provided by the other vehicles to determine an overall order of vehicles in the consist. In some embodiments, the order determination described herein may be used as an initial determination of order. In some embodiments, the order determination may be used to check, confirm, or correct an order previously specified, for example, via operator input, or an order provided by a stored file or record.

The determined ordering may be used, for example, to fine tune operational commands to individual vehicles in a consist based on the particular order of the vehicles within a consist. For example, when a portion of a consist has crested a grade, but other vehicles are still ascending the grade, the vehicles located toward the front of the consist may be given reduced tractive effort commands (or increased braking commands) and/or the vehicles located toward the rear of the consist may be given increased tractive effort commands.

The determined ordering may also be utilized to improve redundancy or robustness of a measurement, determination, or operation of a consist. For example, in one example scenario, positioning information of a lead vehicle in a consist may typically be determined via a GPS detection unit disposed onboard the lead vehicle. If the GPS detection unit onboard the lead vehicle malfunctions or otherwise becomes unavailable, the determined ordering may be used to identify the closest vehicle to the lead vehicle and use positioning information from a GPS unit disposed onboard the closest vehicle to determine the position of the lead vehicle (for example, using the position of the closest vehicle as a rough approximation of the position of the lead vehicle, or, as another example, by applying an offset to the position of the closes vehicle to determine the position of the lead vehicle).

Figure 1:
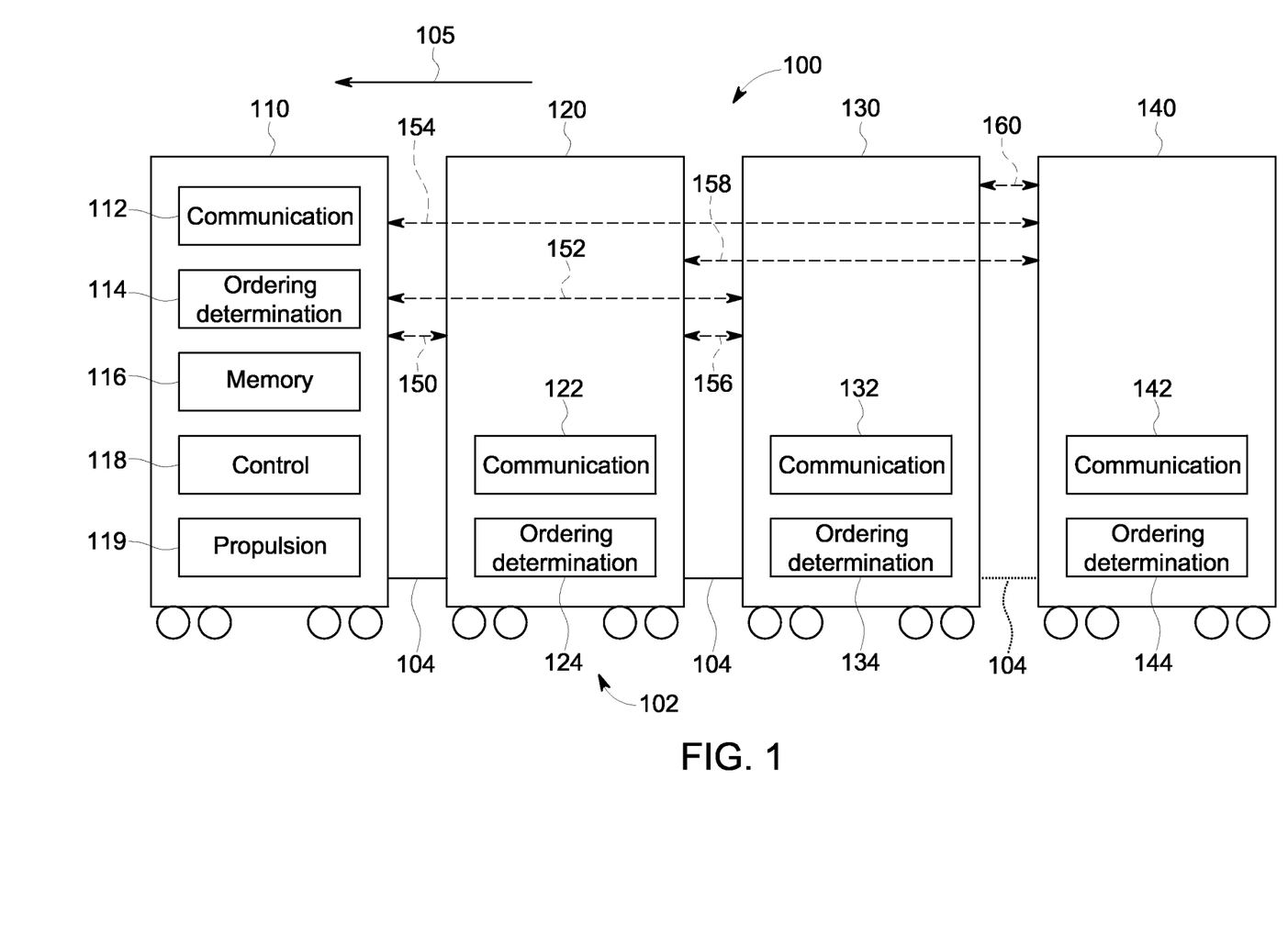
FIG. 1 is a schematic diagram of a communication and control system for a vehicle consist, according to an embodiment.

FIG. 1 illustrates a schematic view of a communication and control system 100 for a vehicle consist 102 in accordance with an embodiment. The vehicle consist 102 may include plural vehicles, such as powered units. The vehicle consist 102 of the depicted embodiment includes a total of "n" powered vehicles, identified in FIG. 1 as a first vehicle 110, a second vehicle 120, a third vehicle 130, and an $n^{th}$ vehicle 140. The vehicle consist may be considered to be ordered in a direction of travel 105, with the vehicles identified as $1^{st}$, $2^{nd}$, $3^{rd}$, $4^{th}$ . . . $n^{th}$ along the direction of travel 105. In the illustrated embodiment, the first vehicle 110 is the forward most vehicle along the direction of travel 105 and the $n^{th}$ vehicle 140 is the rearward most vehicle along the direction of travel 105. In the illustrated embodiment, the first vehicle 110 is configured as a logical lead powered unit, and the other depicted vehicles 120, 130, 140 are configured as logical trail powered units that receive control commands from the first vehicle 110. In other embodiments, the logical lead powered unit may not necessarily be disposed in a forward most position in the direction of travel 105. The vehicles 110, 120, 130, 140 may be propulsion-generating vehicles. The vehicles 110, 120, 130, 140 in some embodiments are rail vehicles, such as powered rail vehicles or locomotives. Messages or commands from the lead powered unit may be transmitted to the trail powered units to control one or more operations of the trail powered units. In the illustrated embodiment, the vehicles joined are joined by a communication path 104. For example, the vehicles may be joined by a multiple unit (MU) line, so that the communication path 104 physically extends through the vehicles of the consist. Messages or packets may be sent along virtual paths or tunnels so that a given message may be just communicated between a pair of vehicles instead of to all vehicles in a consist. Other communication paths (e.g., wireless) may be employed in various alternate embodiments.

The first vehicle 110 includes a first communication module 112, a first ordering determination module 114, a memory 116, a first control module 118, and a propulsion module 119. The memory 116 may be accessed or utilized by one or more aspects of the first vehicle 110, such as the first ordering determination module 114 or the first control module 118. The first control module 118 is configured to develop and/or determine control messages for operational aspects of the first vehicle 110, such as the propulsion module 119. The propulsion module 119 is configured to propel the vehicle 110 along a route, such as a railroad track. The propulsion module 119 may include, for example, wheels and drive assemblies, as well as braking components or systems, such as dynamic braking components or systems. In some embodiments, for example, where the first vehicle 110 is configured as the lead vehicle of the consist 102, the first control module 118 may be configured to determine or develop control message for operational aspects of other vehicles of the consist. The first control module 118 may be configured to develop a trip plan corresponding to a series of propulsion commands to be performed by each of the vehicles 110, 120, 130, 140 to perform a mission.

As depicted in FIG. 1, the first communication module 112 is configured to be disposed on-board the first vehicle 110. Also, the first communication module 112 is configured to send and receive information to and from other vehicles of the consist 102. The first communication module 112 may be configured to communicate individual messages with plural vehicles (e.g., second vehicle 120, third vehicle 130, $n^{th}$ vehicle 140) of the consist 102. The individual messages may be targeted for communication with particular respective individual vehicles of the vehicle consist. For example, the first communication module 112 may be configured as a router/transceiver configured to send packets of information via modulated signals sent over one or more channels of a MU line. The messages may be sent via Ethernet over MU (eMU), with each message including a control portion such as a header portion and a payload portion, with the header portion specifying a particular vehicle to which the message is targeted. Thus, a first header may designate a packet for communication between the first vehicle 110 and the second vehicle 120, a second header may designate a packet for communication between the first vehicle 110 and the third vehicle 130, a third header may designate a packet for communication between the second vehicle 120 and the third vehicle 130, and the like. Only communication modules disposed onboard the particular vehicle(s) identified in a header may de-modulate or otherwise analyze a given packet, with the communication modules of other vehicles not identified in the header of the given packet ignoring or disregarding the packet. These messages may be understood as being sent via tunnels, with each tunnel connecting a distinct pair of vehicles.

In FIG. 1, a number of tunnels communicatively linking distinct pairs of powered units are depicted as dashed lines. The tunnels may be understood as virtual tunnels connecting distinct pairs of powered units, as one or more of the tunnels may physically be included as part of single line joining the powered units, such as the communication path 104 (e.g., a MU line). In the illustrated embodiment, a tunnel 150 communicatively links the first vehicle 110 and the second vehicle 120, a tunnel 152 communicatively links the first vehicle 110 and the third vehicle 130, a tunnel 154 communicatively links the first vehicle 110 and the $n^{th}$ vehicle 140, a tunnel 156 communicatively links the second vehicle 120 and the third vehicle 130, a tunnel 158 communicatively links the second vehicle 120 and the $n^{th}$ vehicle 140, and a tunnel 160 communicatively links the third vehicle 130 and the $n^{th}$ vehicle 140. Additional tunnels may be used to communicatively link additional powered units.

For example, the first communication module 112 may be configured to develop and send messages via the appropriate tunnels including individual propulsion commands (e.g., as a portion of a payload portion of a packet) to the second vehicle 120, the third vehicle 130, and the $n^{th}$ vehicle 140, and to receive specific individual status messages from the second vehicle 120, the third vehicle 130, and the $n^{th}$ vehicle 140. Information from the status messages may be used to determine a future command to at least one of the second vehicle 120, the third vehicle 130, and the nth vehicle 140, to revise a trip plan, or the like.

The first communication module 112 may also be configured to send messages that have been configured or developed specifically for measuring or determining message characteristic information, and to determine a characteristic (e.g., rate) for the various tunnels through which the first communication module 112 is configured to transmit or receive messages (e g, tunnels 150, 152, 154). Message characteristic information may be understood as information corresponding to one or more characteristics of the transmission of messages, and not necessarily the content of the messages themselves. For example, message characteristic information may include information regarding the time consumed by the sending or receiving of a message, a communication rate at which information may be transmitted between a pair of vehicles in a consist, or the like. The communication rate may correspond to a rate negotiated between routers of a pair of vehicles. As another example, message characteristic information may include information corresponding to signal quality metrics, such as signal to noise ratio (SNR).

A message may be configured or developed specifically for measuring or determining message characteristic information, for example, by being configured to have an amount or volume of data that is relatively large (e.g., an amount at or near the limit of data that may be sent through a given tunnel in a relatively short amount of time). For example, a message or messages at or near the limit of amount of data a particular tunnel may accommodate over a given time period may be sent through the tunnel, and the amount of time required to transmit and receive the data and/or a communication rate through the given tunnel may be determined. As another example, messages sent to different vehicles from a given vehicle may be configured to be substantially the same size or contain substantially the same number of bits or amount of data to help provide uniformity in the determination of message characteristic information. In some embodiments, a characteristic (such as rate) may be measured during the transmission of messages that are configured for operational use by one or more units of a vehicle system, for example messages that contain commands for tractive efforts or status information. In some embodiments, a characteristic (such as rate) may be measured during the transmission of messages that are configured for operational use, but have been modified. For example, a message containing a command for a tractive effort, or, as another example, status information, may be modified so that the message is larger than necessary to convey the command or status information, with the increased size of the message configured to improve the measurement of a characteristic (such as rate).

Data communication rates along one or more tunnels may not be constant and may vary for a variety of reasons over relatively short time increments, thereby providing a potential source of error when determining a communication rate for a given tunnel, as well as when comparing relative values of rates determined for different tunnels. Thus, in some embodiments, messages (e.g., messages configured to determine a rate (or other characteristic)) may be sent substantially simultaneously along plural tunnels. Further, larger messages and/or plural messages (e.g., repeated messages configured to determine a rate) may be sent to determine an average rate collected over a large enough time period to help minimize or reduce the effect of any transient changes in rate.

The first ordering determination module 114 is configured to be disposed onboard the first vehicle 110. The first ordering determination module 114 is configured to determine an order of plural vehicles in the consist 102 using message characteristic information obtained via the first communication module 112. The message characteristic information, as also discussed above, corresponds to a transmission characteristic of individual messages. The transmission characteristic of a message represents one or more parameters of the transmission of the message, as opposed to the contents of the message, in one embodiment. For example, a communication rate at which messages are communicated between vehicles may be determined as a transmission characteristic using individual messages sent between each pairs of vehicle, and the communication rates used to determine the order of the vehicles in the consist 102. As another example, the signal-to-noise ratios of messages that are communicated between vehicles may be determined as a transmission characteristic using individual messages sent between each pairs of vehicle, and the signal-to-noise ratios used to determine the order of the vehicles in the consist 102.

In one example scenario, the first communication module 112 may send messages to each of the other vehicles of the consist 102 depicted in FIG. 1. Thus, the first communication module sends a first message to the second vehicle 110 via tunnel 150, a second message to the third vehicle 130 via tunnel 152, and a third message to the $n^{th}$ vehicle 140 via tunnel 154. The first communication module 112 then determines message characteristic information (e.g., communication rate, signal quality metric, or the like) for each of the individual messages sent to the particular vehicles of the consist 102.

For example, the first communication module 112 may determine a communication rate along each tunnel Generally speaking, the closer two vehicles (or two communication modules are), the higher the rate of communication will be. Closer vehicles may be able to negotiate faster rates of communication due to higher signal-to-noise ratios and/or shorter propagation paths than more distantly located vehicles. Thus, the first communication module 112 may determine that the rate of communication between the first vehicle 110 and the second vehicle 120 is higher than the rate of communication between the first vehicle 110 and the third vehicle 130, and that the rate of communication between the first vehicle 110 and the third vehicle 130 is higher than the rate of communication between the first vehicle 110 and the $n^{th}$ vehicle 140. Additionally or alternatively, the first communication module 112 may compare the signal-to-noise ratios of the messages. For example, the messages communicated between closer vehicles may have greater signal-to-noise ratios than the vehicles that are spaced apart by longer distances. The first ordering determination module 114 may then determine distance information, using the message characteristic information corresponding to the communication rates between the various vehicles and the first vehicle 110. Continuing the above discussed example, the first ordering determination module 114 may determine that the second vehicle 120 is closer to the first vehicle 110 than are the third vehicle 130 and the nth vehicle 140 (using the higher or faster rate of communication between the first vehicle 110 and the second vehicle 120 compared to the rates of communication between the first vehicle 110 and the other vehicles), determine that the third vehicle 130 is farther from the first vehicle 110 than the second vehicle 120 but closer than the nth vehicle 140 is to the first vehicle 110, and determine that the nth vehicle 140 is farther from the first vehicle 110 than are the other vehicles. In some embodiments, the first communication module 112 may determine or develop the distance information and communicate the distance information to the first ordering determination module 114.

The first ordering determination module 114 may be configured to determine the order of the vehicles in the consist using the distance information along with lead information. The lead information may designate, indicate, or identify the lead vehicle of a consist, or the forward most vehicle of a consist. As one example, a lead vehicle may be identified as a source of one or more air brake commands. For instance, the first ordering determination module 114 (or other module in communication with the first ordering determination module 114) may be configured to note from which vehicle an air braking command originates and identify that particular vehicle as the lead vehicle. Alternatively or additionally, as another example, the lead or forward most vehicle (in some embodiments, the lead vehicle may not be the forward most vehicle) may be identified using configuration information provided by a trip planner or other control aspect of the consist.

The first ordering determination module 114 may be configured to use the distance information and/or the message characteristic information, as well as the lead information, to determine the order of the vehicles in the consist 102. For example, continuing the example scenario discussed above, the first ordering determination module 114 may determine from the lead information that the first vehicle 110 is the lead vehicle and the forward most vehicle of the consist 102. Then, because the first vehicle 110 is forward most and the second vehicle 120 is closest to the first vehicle 110, the first ordering module 114 may determine that the second vehicle 120 is the second vehicle from the front. Also, because the third vehicle 130 is the next closest vehicle, then the first ordering determination module 114 may determine that the third vehicle 130 is the third vehicle from the front, and so on until all of the vehicles have been ordered.

In some circumstances, for example where there is substantial variability in communication rates, or, as another example, where a consist is long enough so that communication rates and/or signal-to-noise ratios for messages communicated between one vehicle and relatively distant vehicles may be substantially similar, a determination module may use distance or ordering information from additional vehicles to supplement all or a portion of the ordering or distance information determined onboard a lead vehicle. In some embodiments, the first ordering determination module 114 may be configured to use at least one of distance or ordering information determined or developed at trail powered units (e.g., second vehicle 120, third vehicle 130, $n^{th}$ vehicle 140) to determine an order of vehicles in the consist 102. For example, plural vehicles (e.g., each powered unit of a consist) may send messages (e.g., from an associated communications module via a series of tunnels) to other vehicles (e.g., each other powered unit of a consist) or otherwise determine a communication rate or other message characteristic information, with each such vehicle having an ordering determination module disposed thereon and configured to determine distance and/or ordering information for each other vehicle relative to itself. The distance information (or ordering information) may then be sent to a single vehicle (e.g., a lead or forward most vehicle) for analysis and determination of the overall order of the consist. In some embodiments, the lead vehicle may receive distance information from plural trail vehicles and arbitrate between any inconsistent findings. In some embodiments, the lead vehicle may preferentially use information from a vehicle that is closer to the vehicle or vehicles in question, or may use information having better signal quality metrics associated therewith.

In one example scenario, a consist may include ten serially connected powered units. Distance information from two of the vehicles, for example, the second forward most unit and the rearward most unit, may conflict regarding the relative ordering or placement of two or more other units, for example, the eighth and ninth forward most units (or, put another way, the second and third rearward most units). An ordering determination module onboard a lead unit may then arbitrate between the conflicting information. For example, the ordering determination module may use information from a vehicle deemed to be closer to the vehicles in question. For example, if based on distance information, the ordering determination module determines that one of the reporting vehicles is closer to the vehicles in question, then the information or ordering provided or indicated by the closer vehicle may be used. As another example, information may be used from a vehicle reporting a higher communication rate with the vehicles in question. As one more example, the trail vehicles may provide signal quality information along with the distance information, and the ordering determination module may use the information provided by the vehicle reporting better signal quality metrics with the vehicles in question. For example, in the above example scenario, the tenth vehicle may report higher communication rates with the vehicles in question (the eighth and ninth vehicles), and the ordering determination module may preferentially use the information provided by the tenth vehicle over information provided by the second vehicle with respect to the ordering of the eighth and ninth vehicles. In some embodiments, information from plural vehicles may be weighted or averaged to determine ordering of the vehicles in a consist.

In some embodiments, the order determination module 114 may be configured to determine an order using message characteristic information obtained or determined via messages sent from a communication module of a single vehicle (e.g., a lead vehicle). For example, messages sent from a lead vehicle may be used to determine communication rates between the lead vehicle and each trail powered unit. If the resulting message characteristic information is of a sufficient quality or provides a sufficient level of confidence, then the order determined using the information obtained may be used to determine the order of vehicles in the consist. However, if the information does not provide a satisfactory level of confidence (e.g., if signal metric quality does not reach a threshold level, if relative communication rates or other message characteristic information for two or more trail powered units are not substantially different or are within a threshold difference level, or the like), then supplemental techniques may be employed to provide a higher amount or quality of information. For example, communication rates may be determined simultaneously, communication rates may be determined over longer period of times and/or using more measurements to provide average communication rates, distance and/or ordering information may be determined at multiple vehicles, or the like.

Once the order of the vehicles in the consist is known, the ordering information may be used in operating the consist 102. For example, previously determined tractive efforts of a trip plan may be modified or fine-tuned based on the ordering information. In some embodiments, throttle or braking commands may be altered based upon a positioning of vehicles relative to a crest or sag using a determined order of vehicles in a consists.

As indicated above, some or all of the trail vehicles of the consist 102 may be configured to communicate with a lead vehicle, for example along paths (e.g., tunnels configured for communication between discrete pairs of vehicles). For example, each trail powered unit of a consist may have a defined individual communicative path linking the particular trail powered unit with the lead powered unit of the consist. Each trail powered unit may also have a plurality of defined individual communicative paths linking the particular trail powered unit with each other trail powered unit of the consist. The trail vehicles may also be configured to determine message characteristic information, either acting alone or in cooperation with one or more other vehicles. Further, the trail vehicles may be configured to determine ordering or distance information of other vehicles in the consist.

In the illustrated embodiment, the second vehicle 120 is configured as a trail powered unit, and includes a second communication module 122, a second ordering determination module 124, and a memory associated therewith (not shown). The second vehicle 120 may also include a control module (not shown) configured to provide commands (e.g., commands received from a lead control module or commands created responsive to messages received from a lead control module) to operational aspects of the second vehicle 120, such as a propulsion module (not shown). The memory may be accessed or utilized by one or more aspects of the second vehicle 120, such as the second ordering determination module 124 or a control module.

As depicted in FIG. 1, the second communication module 122 is configured to be disposed on-board the second vehicle 120. The second communication module 120 may be configured to send and receive information to and from other vehicles of the consist 102. The second communication module 120 may be configured to communicate individual messages with plural vehicles (e.g., first vehicle 110, third vehicle 130, $n^{th}$ vehicle 140) of the consist 102. The individual messages may be targeted for communication with particular respective individual vehicles of the vehicle consist. For example, the second communication module 120 may be configured as a router/transceiver configured to send packets of information via modulated signals sent over one or more channels of a communication path (e.g., communication path 104) such as an MU line. The messages may be sent via eMU, with each message including a header portion and a payload portion, with the header portion specifying a particular vehicle to which the message is targeted. Only communication modules disposed onboard the particle vehicle(s) identified in a header may de-modulate or otherwise analyze a given packet, with the communication modules of other vehicles not identified in the header of the given packet ignoring or disregarding the packet. These messages may be understood as being sent via tunnels, with each tunnel connecting a distinct pair of vehicles.

Similar in certain respects to the first communication module 112, the second communication module 122 may also be configured to send messages that have been configured or developed specifically for measuring or determining message characteristic information, and to determine a characteristic (e.g., rate) for the various tunnels through which the second communication module 122 is configured to transmit or receive messages (e.g., tunnels 150, 156, 158). For example, message characteristic information may include information regarding the time consumed by the sending or receiving a message between the second vehicle 120 and a given vehicle, a rate at which information may be transmitted between the second vehicle 120 and a given vehicle, or the like. A message sent via the second communication module 122 may be configured or developed specifically for measuring or determining message characteristic information, for example, by being configured to have an amount or volume of data that is relatively large (e.g., an amount at or near the limit of data that may be sent through a given tunnel in a relatively short amount of time).

In some embodiments, the second communication module 122 may determine a communication rate along each tunnel through which the second vehicle 120 communicates with other vehicles. The second ordering determination module 124 may then determine distance information, using the message characteristic information provided by the second communication module 122, with the distance information corresponding to the communication rates between the various vehicles and the second vehicle 120. The distance information (or ordering information) determined by the second ordering determination module 124 may then be forwarded to the first ordering determination module 114, with the first ordering determination module 114 using distance information determined locally at the various vehicles of the consist to determine the order of vehicles in the consist, for example to supplement distance information determined for the first vehicle 110 relative to the other vehicles in the consist.

The third vehicle 130 and the $n^{th}$ vehicle 140 in the illustrated embodiment are configured substantially similarly in many general respects to the second vehicle 120. For example, in the illustrated embodiment, the third vehicle 130 and the $n^{th}$ vehicle 140 are configured as trail powered units. The third vehicle 130 includes a third communication module 132 and a third ordering determination module 134, and the $n^{th}$ vehicle includes an $n^{th}$ communication module 142 and an $n^{th}$ ordering determination module 144. The third and $n^{th}$ vehicles 130, 140 may also each include a control module (not shown) configured to provide commands (e.g., commands received from a lead control module or commands created responsive to messages received from a lead control module) to operational aspects of the vehicle on which the control module is disposed, such as a propulsion module (not shown). Associated memories (not shown) may be accessed or utilized by one or more aspects of the vehicles. The communication modules and ordering determination modules of the third vehicle 130 and the $n^{th}$ vehicle 140 may be configured generally similar to the corresponding modules of the second vehicle 120.

In a relatively simple example scenario, message characteristic information may be determined for separate paths or tunnels from a first to other vehicles of a consist, with determined distances from the first vehicle used to order the vehicles in the consist. In other example scenarios, distance or ordering information determined at additional vehicles may be used to supplement information determined relative to the first vehicle.

The table below depicts an example scenario illustrating determination of an order of a consist having three vehicles, in accordance with various embodiments. As shown in the table below, the example consist includes three vehicles, namely "A," "B," and "C."

| Path | Communication Time |
|------|-------------------|
| A to B | 42.9 Mbits/second |
| A to C | 14.8 Mbits/second |
| B to A | 26.5 Mbits/second |
| B to C | 29.4 Mbits/second |

In the example scenario, the above times were determined based on messages sent at different times. One or more of the paths above may be checked or confirmed utilizing rates determined using messages sent at the substantially same time. For example, a determining module may notice the difference between the paths A to B and A to C, and messages may be re-sent at substantially the same time to confirm that B and C are different distances from A (e.g., B is closer because A to B has the higher communication rate). For instance, utilizing messages sent substantially at the same time, the communication rate A to B may be determined as 26.0 Mbits/second and A to C may be determined as 10.4 Mbits/second, thereby confirming that B is closer to A than is C. In various embodiments, particularly where the number of vehicles in the consist becomes larger, averaged rates and/or the use of messages sent at substantially similar times may be used to improve resolution of relative distances from a plurality of vehicles to a given vehicle. It may also be noted that in the example table, the paths are considered to extend along a single direction, so that a separate rate is determined for messages for B to A than determined for A to B.

Returning to the example scenario depicted in the table, it can be seen that the communication rate from A to B is substantially higher than the communication rate from A to C. Thus, a determining module using the message characteristic information may determine that the distance from A to B is less than the distance from A to C. Similarly, it can be seen from the table that the communication rates from B to A and from B to C are quite similar. For example, a determining module may determine that two vehicles are equally distant from a third vehicle (e.g., disposed on opposite sides of the third vehicle) if the communication rates between the two vehicles and the third vehicles are substantially similar (e.g., within a threshold value or percentage). Thus, the determining module may determine that B is about the same distance from vehicles A and C.

Because it is thus determined that B is about the same distance from both A and C, and that A is closer to B than A is to C, the determining module may then determine that A and C are located on either end of B, or that B is interposed between A and C. If the identity of the lead or forward most vehicle is known, the order of the consist may be determined using the distance or ordering information along with the information identifying the lead vehicle. In the example scenario, A may be the lead or forward most vehicle. Thus, because it has already been determined that B is interposed between A and C, the order may be determined as A-B-C (from front to rear along a direction of travel).

The above example scenario is intended by way of example and illustration and not by way of limitation. For example, in other embodiments, alternative or additional message characteristic information (e.g., a signal quality metric such as SNR) may be employed. Different numbers of vehicles in consists (e.g., four, five, or more) may be present in various embodiments. In some embodiments, all of the vehicles of a consist may be ordered, and in some embodiments a limited subset of the vehicles of a consist may be ordered. Further, in some embodiments, a vehicle system may include plural consists, with some or all of the consists independently determining the order of vehicles for that particular consist.

Figure 2:
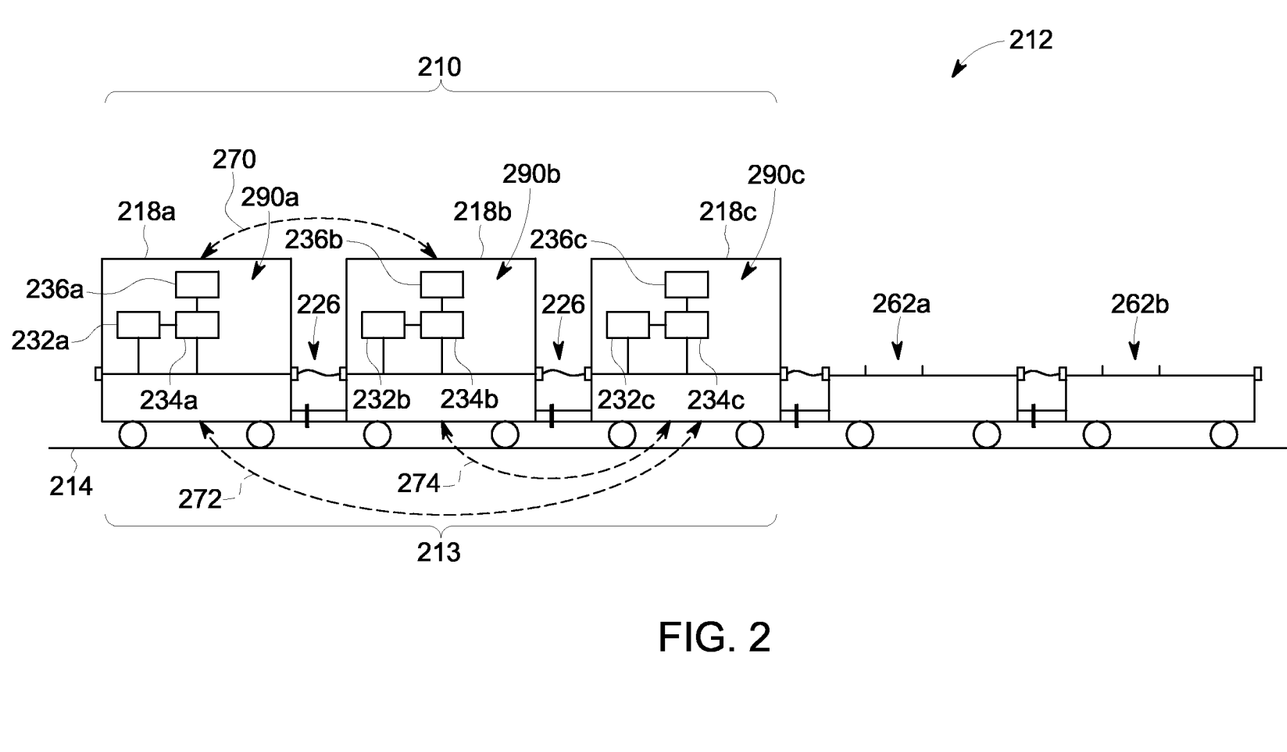
FIG. 2 is a schematic diagram of a communication system for communicating data in a vehicle consist, according to an embodiment.

FIG. 2 illustrates a system network (or communication system) 210 of a vehicle system 212 formed in accordance with one embodiment. The vehicle system 212 includes a plurality of vehicles (or units) 218a-218c and 262a, 262b that are mechanically coupled to one another, and are configured to traverse a route 214. The vehicle system 212 of the illustrated embodiment corresponds to the above discussed table, with unit 218a corresponding to "A," 218b corresponding to "B," and 218c corresponding to "C." In some embodiments, the vehicles may be rail vehicles (e.g., locomotives) and the route 214 may include railroad tracks. In some embodiments, the vehicle system 212 includes one or more vehicle consists. Different vehicles of a vehicle consist may coordinate operations (e.g., tractive and braking efforts) with other vehicles in the consist to move the vehicle consist and, consequently, the vehicle system. The vehicle system 212 may include only a single vehicle consist or a plurality of vehicle consists. For such embodiments that include multiple vehicle consists, each vehicle consist may coordinate operations with other vehicle consists to move the vehicle system. For example, individual consists may communicate with each other via a wireless communication system.

In the illustrated embodiment, the vehicle system 212 is configured including a single vehicle consist that includes multiple vehicles or units. In other embodiments, however, the vehicle system 212 may include a plurality of vehicle consists that are directly or indirectly linked to one another in the vehicle system 212. As shown, the vehicle system 212 includes a plurality of powered vehicles 218a-218c. As used herein, a "powered vehicle" is a vehicle that is capable of self-propulsion. The vehicle system 212 may also include non-powered vehicles (or units) 262a, 262b that do not provide propulsive efforts. In the illustrated embodiment, the non-powered vehicles 262a, 262b are rail cars used for cargo and/or carrying passengers. The term "powered," however, refers to the capability of the powered vehicles 218a-218c to propel themselves and not to whether the powered vehicles 218a-218c or the non-powered vehicles 262a, 262b receive energy (e.g., electric current) for one or more purposes. For example, the non-powered vehicles 262a, 262b may receive electric current to power one or more loads disposed on-board the non-powered vehicles 262a, 262b.

In some embodiments, the vehicle 218a controls operation of the vehicles 218b and 218c and, as such, the vehicle 218a may be referred to as a lead vehicle and the vehicles 218b, 218c may be referred to as trail vehicles. The vehicles 218b, 218c may or may not trail the vehicle 218a when the vehicle system 212 is in motion. In alternative embodiments, however, control of the different operations of the vehicle system 212 may be distributed among a plurality of the vehicles. In the illustrated embodiment, each of the vehicles 218a-218c is adjacent to and mechanically coupled with another vehicle in the vehicle system 212 such that each and every vehicle is directly or indirectly connected to the other vehicles. In one or more embodiments, the non-powered vehicles 262a, 262b may be positioned before, after, or between the powered vehicles 218a-218c.

Each of the vehicles 218a, 218b, 218c may include a communication module 234a-c (see discussion above) and an ordering determination module 236a-c (see discussion above). In the illustrated embodiment, the communication modules are configured as router/transceiver units. In some embodiments, each of the vehicles 218a, 218b, 218c may determine ordering or distance information corresponding to a distance or position of the other vehicles with respect to itself. The information determined locally at each vehicle may then be forwarded to a designated vehicle (e.g. lead vehicle 218a), with the ordering determination module of the lead vehicle determining an order of the consist using the information provided.

The system network 210 may include a plurality of sub-networks. For example, the system network 210 may be a wide area network (WAN) and the sub-networks may be local area networks (LANs). In the illustrated embodiment, each of the vehicles 218a-218c includes a corresponding vehicle network 290a-290c, respectively. In some embodiments, the vehicle networks 290a-290c may constitute separate LANs that are part of a WAN (e.g., the system network 210). Although not shown, the vehicles 262a, 262b may also include a vehicle network in alternative embodiments.

In some embodiments, the system network 210 corresponds to a single vehicle consist (e.g., the vehicle consist 213). The vehicle system 212 may have a plurality of vehicle consists and, as such, the vehicle system 212 may include a plurality of system networks. Accordingly, in some embodiments, a single vehicle system 212 may include multiple WANs in which at least one of the WANs includes a plurality of vehicle networks (or LANs). In such embodiments, each of the vehicle consists may coordinate operations among the vehicles to move the vehicle system. The vehicle consists may also coordinate operations with one another to move the vehicle system.

Each of the vehicle networks 290a-290c may include a plurality of operational components 232a-c that are communicatively coupled to the corresponding vehicle network. Each of the operational components may have a network address (e.g., IP address) within the corresponding vehicle network. The network address may be a static or designated address that is established or assigned by an industry or proprietary standard or the address may be a dynamic address designated by the system network 210. Data may be transmitted between the different vehicles 218a-218c of the vehicle system 212 or, more specifically, between the different vehicle networks 290a-290c. For example, data may be transmitted from the vehicle 218a to the vehicle 218b. In some embodiments, data transmitted within the vehicle networks 290a-290c (e.g., intra-network) is configured for one communications protocol, and data transmitted between the vehicle networks 290a-290c in the system network 210

(e.g., inter-network) is configured for a different communications protocol. Further still, data transmitted between the various vehicle networks 290a-290c may be transmitted along multiple paths or tunnels.

In the illustrated embodiment, a first tunnel 270 is defined between the vehicle 218a and the vehicle 218b. Also, a second tunnel 272 is defined between the vehicle 218a and the vehicle 218c. Further, a third tunnel 274 is defined between the vehicle 218b and the vehicle 218c.

The data sent via the tunnels may be transmitted over a communication channel or line, such as a multiple unit (MU) cable system 226. The MU cable system 226 may include an electrical bus that interconnects the lead powered vehicle 218a and the remote powered vehicles 218b, 218c in the vehicle system 212.

In some embodiments, a portion of the data may be transformed (e.g., modified, modulated, and/or converted) prior to transmission over the MU cable system 226. For example, transformed network data may be data that is at least one of encapsulated or modulated. When data is encapsulated and/or modulated, the data may be changed from one form to a second, different form. Depending on the form, the data may be configured for transmission within a vehicle network or, separately, may be configured for transmission between vehicle networks. This transformed network data may be subsequently decapsulated (or translated) or demodulated such that the data is changed from the second form to the first form. In other embodiments, the data may be changed from the second form to a different, third form when the modified data is decapsulated or demodulated.

For various communication functions, the system network 210 may include router transceiver units 234a, 234b, 234c that are disposed on-board the vehicles 218a, 218b, 218c, respectively, and are described in greater detail below. The router transceiver units 234a, 234b, 234c may be communicatively coupled to operational components 232a, 232b, 232c, respectively, which are also disposed on-board the respective vehicles, as well as to the ordering determination modules 236a, 236b, 236c.

Figure 3:
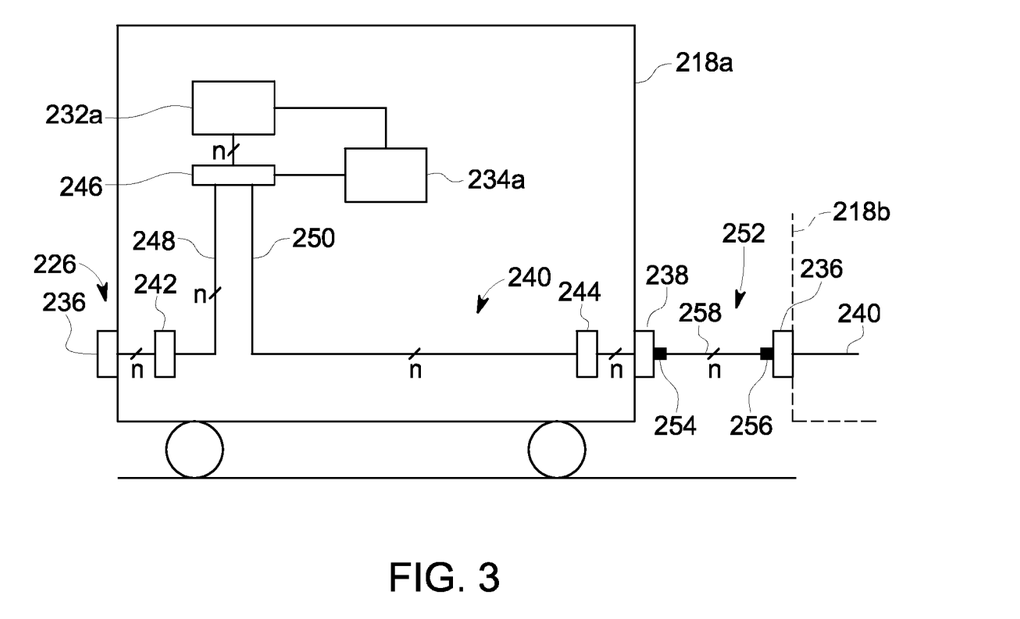
FIG. 3 is a schematic diagram of a multiple unit (MU) cable system in a vehicle, shown in the context of the system network of FIG. 2.

FIG. 3 shows aspects of the vehicle 218a and the MU cable system 226 in greater detail according to an embodiment. However, it should be noted that FIG. 3 illustrates one example of a powered vehicle and MU cable system and that other configurations may be possible. In some embodiments, the MU cable system 226 may be an existing electrical bus interconnecting the vehicle 218a and the vehicles 218b, 218c in the vehicle consist 213 (see FIG. 2). In the illustrated embodiment, for each of the vehicles 218a-218c, the MU cable system 226 comprises a first MU port 236, a second MU port 238, and an internal MU electrical system 240 that connects the first port 236 and the second port 238 to one or more operational components 232a of the vehicle 218a. In the example embodiment depicted in FIG. 3, the internal MU electrical system 240 comprises a first terminal board 242 electrically connected to the first MU port 236, a second terminal board 244 electrically connected to the second MU port 238, a central terminal board 246, and first and second electrical conduit portions 248, 250 electrically connecting the central terminal board 246 to the first terminal board 242 and the second terminal board 244, respectively. The one or more operational components 232a of the vehicle 218a may be electrically connected to the central terminal board 246 and, thereby, to the MU cable system 226 generally.

Figure 4:
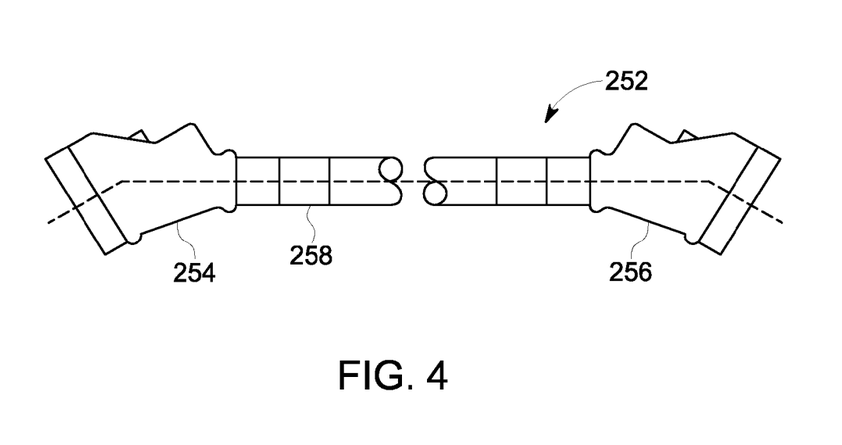
FIG. 4 is a schematic diagram of an MU cable jumper.

As shown in FIGS. 3 and 4, the MU cable system 226 further comprises an MU cable jumper 252. The jumper 252 comprises first and second plug ends 254, 256 and a flexible cable portion 258 electrically and mechanically connecting the plug ends together. The plug ends 254, 256 fit into the MU ports 236, 238. The MU cable jumper 252 may be electrically symmetrical, meaning either plug end can be attached to either port. The MU cable jumper 252 is used to electrically interconnect the internal MU electrical systems 240 of the adjacent vehicles 218a, 218b. As shown in FIG. 3, for each adjacent pair of vehicles 218a, 218b, one plug end 254 of an MU cable jumper 252 is attached to the second MU port 238 of the powered vehicle 218a, and the other plug end 256 of the MU cable jumper 252 is attached to the first MU port 236 of the powered vehicle 218b. The flexible cable portion 258 of the MU cable jumper 252 extends between the two plug ends, providing a flexible electrical connection between the two vehicles 218a, 218b.

The cable portion 258 (of the MU cable jumper 252) may include a plurality of discrete electrical wires, while the conduit portions 248, 250 each include one or more discrete electrical wires and/or non-wire electrical pathways, such as conductive structural components of the vehicle, pathways through or including electrical or operational components, circuit board traces, or the like. Although certain elements in FIG. 3 are shown as including "n" discrete electrical pathways, it should be appreciated that the number of discrete pathways in each element may be different, i.e., "n" may be the same or different for each element.

In some embodiments, the plug ends 254, 256 may include a plurality of electrical pins, each of which fits into a corresponding electrical socket in an MU port. The number of pins and sockets may depend on the number of discrete electrical wires or channels extant in the internal electrical system 240, MU cable jumper 252, etc. In one example, each plug end 254, 256 is a twenty seven-pin plug.

The central terminal board 246, the first terminal board 242, and the second terminal board 244 may each comprise an insulating base (attached to the vehicle) on which terminals for wires or cables have been mounted. This may provide flexibility in terms of connecting different operational components to the MU cable system.

Depending on the particular type and configuration of the vehicle, the electrical conduit portions 248, 250 and MU cable jumpers 252 may be configured in different manners, in terms of the number "n" ("n" is a real whole number equal to or greater than 1) and type of discrete electrical conduits. In one example, each conduit portion 248, 250 and the jumper cable portion 258 include a plurality of discrete electrical wires, such as 12-14 gauge copper wires. For example, the MU cable system 226 may include 27 wires (and corresponding pins) configured corresponding to a standard MU configuration.

Signals sent along one or more of the MU lines may be used to transmit information via conventional MU communication techniques, while modulated signals overlayed on one or more of the MU lines may be used to transmit information or messages via a packets as discussed above. For example, messages used to determine message characteristic information (e.g., communication rates) may be sent using modulated signal overlayed on one or more of the MU lines.

As used herein, the term "MU cable system" refers to the entire MU cable system or any portion(s) thereof, e.g., terminal boards, ports, cable jumper, conduit portions, and the like. As should be appreciated, when two vehicles are connected via an MU cable jumper 252, both the MU cable jumper 252 and the internal MU electrical systems 240 of the two vehicles together are part of the MU cable system. As subsequent vehicles are attached using additional MU cable jumpers 252, those cable jumpers and the internal MU electrical systems 240 of the subsequent vehicles also become part of the MU cable system.

Returning to FIG. 2, the system network 210 may include the router transceiver units 234a, 234b, 234c of the respective vehicles 218a, 218b, 218c. The router transceiver units 234a, 234b, 234c may be each communicatively coupled to the MU cable system 226. The router transceiver units in the illustrated embodiment 234a, 234b, 234c are configured to transmit and/or receive data in a standard MU format or other non-network data as well as data transmitted via a modulated signal over one or more wires or channels of a MU cable, such as via eMU, or other network data, over the MU cable system 226. The router/transceiver units 234a-234c may be incorporated into, for example, a communication module (e.g. communication modules 112, 122, 132. In some embodiments, the router transceiver units 234a, 234b, 234c are configured to change the data into a different form so that the data may be used by other operational components. For example, the router transceiver units 234a, 234b, 234c may be configured to decapsulate or demodulate the data after the data is received.

Figure 5:
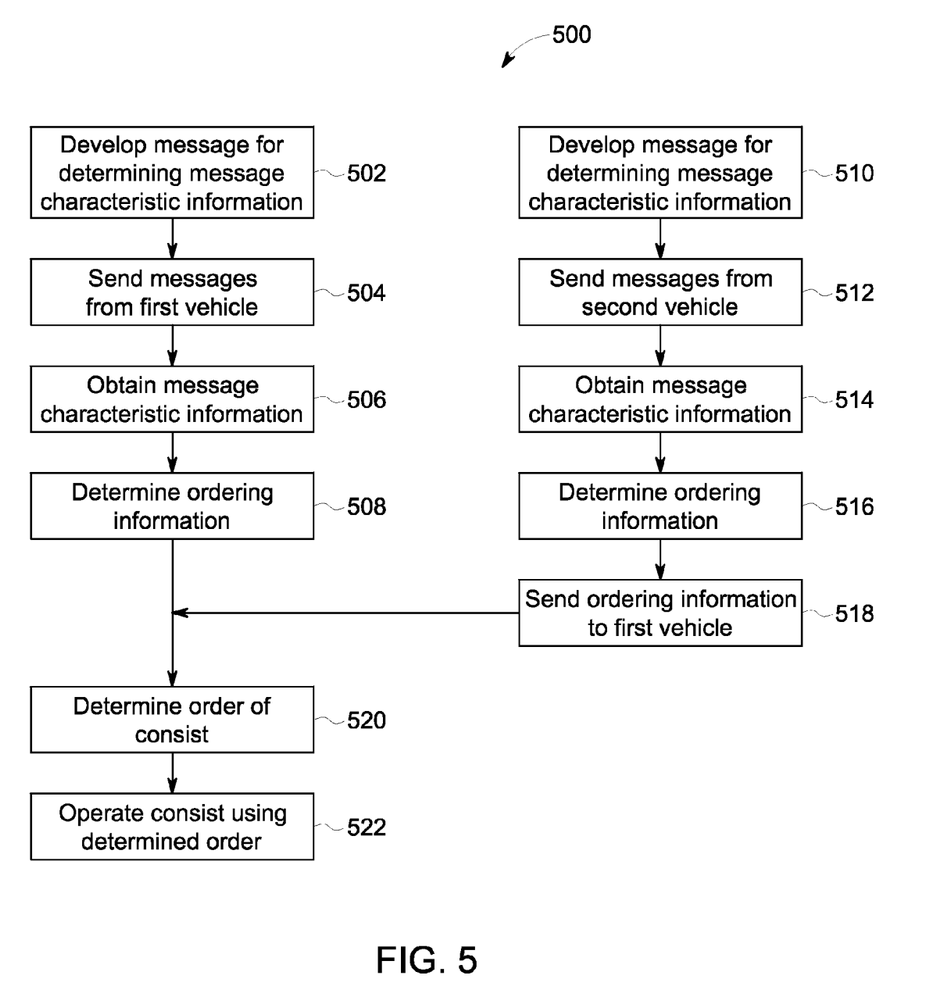
FIG. 5 illustrates a flowchart of a method for communicating between different vehicles of a vehicle system in accordance with one embodiment.

FIG. 5 illustrates a flowchart of a method 500 for determining the order of vehicles of a vehicle system (e.g., powered units of a consist), in accordance with one embodiment. The method 500 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion.

At 502, a message for determining message characteristic information is developed. The message may be configured for determining message characteristic information, such as a communication rate. For example, the message may be configured to be of a sufficient size to reliably measure a communication rate via a tunnel between two vehicles over a given amount of time. In some embodiments, the message may include content to be utilized by a target or receiving vehicle during operation or traversal of a route, while in other embodiments the message may be configured solely for the purpose of determining a communication rate.

At 504, messages are sent from a first vehicle of a consist (e.g., the lead vehicle of the consist) to other vehicles in the consist for which an ordering is desired. For example, a message may be sent to each other powered unit of the consist. In some embodiments, the messages may be sent via packets, where the payload portion of the packet is substantially similar for each packet, but where the header (or other control portion) of each packet is configured so that the particular packet is targeted to a single recipient vehicle. For example, the first vehicle of the consist may sent an individual packet (or message) to each powered unit of the consist via a virtual tunnel communicatively coupling the particular powered unit to the lead unit. The packets or messages may be send substantially simultaneously. In some embodiments, the packets may be sent at more than one time, for example, to determine an average communication rate. In some embodiments, the payload portion of the packets sent to each vehicle may be substantially similar, while in other embodiments, the payload portion of the packets sent may vary according to the vehicle to which the particular packet is sent.

At 506, message characteristic information is obtained. Message characteristic information may be obtained describing a transmission characteristic between the first vehicle and each vehicle to which a message was sent at 504. For example, a communication rate may be determined based on the amount of time each vehicle requires to receive and/or acknowledge the particular packet sent. As another example, the communication rate may be determined based on a rate negotiated between two vehicles responsive to the sending of a packet or message from one of the vehicles to the other. Additionally or alternatively, the message characteristic information may include signal quality metric information, such as SNR.

At 508, ordering information is determined. The ordering information may include distance information. For example, the message characteristic information may be used to provide a ranking of each powered unit with respect to the first vehicle. For example, each vehicle may be ranked according to communication rate, with the vehicles having lower communication rates determined to be farther away from the first vehicle than the vehicles having higher communication rates.

At 510, a message for determining message characteristic information is developed. The message may be configured for determining message characteristic information, such as a communication rate, and is configured to be sent by a second vehicle. The message may be substantially similar to the message determined at 502. For example, the message may be configured to be of a sufficient size to reliably measure a communication rate via a tunnel between two vehicles over a given amount of time. In some embodiments, the message may include content to be utilized by a target or receiving vehicle during operation or traversal of a route, while in other embodiments the message may be configured solely for the purpose of determining a communication rate.

At 512, messages are sent from the second vehicle of the consist to other vehicles in the consist for which an ordering is desired. For example, a message may be sent to each other powered unit of the consist. In some embodiments, the messages may be sent via packets, where the payload portion of the packet is substantially similar for each packet, but where the header of each packet is configured so that the particular packet is targeted to a single recipient vehicle. The packets or messages may be send substantially simultaneously. In some embodiments, the packets may be sent at more than one time, for example, to determine an average communication rate.

At 514, message characteristic information is obtained. Message characteristic information may be obtained describing a transmission characteristic between the second vehicle and each vehicle to which a message was sent at 512. For example, a communication rate may be determined based on the amount of time each vehicle requires to receive and/or acknowledge the particular packet sent. As another example, the communication rate may be determined based on a rate negotiated between two vehicles responsive to the sending of a packet or message from one of the vehicles to the other. Additionally or alternatively, the message characteristic information may include signal quality metric information, such as SNR.

At 516, ordering information is determined. The ordering information may include distance information. For example, the message characteristic information may be used to provide a ranking of each powered unit with respect to the second vehicle. For example, each vehicle may be ranked according to communication rate, with the vehicles having lower communication rates determined to be farther away from the second vehicle than the vehicles having higher communication rates. In some embodiments, steps 510-516 may be performed at additional vehicles (e.g., each powered unit of a consist).

At 518 ordering information determined locally at the second vehicle is sent to the first vehicle. In some embodiments, ordering information determined locally at additional vehicles may also be sent to the first vehicle. At 520, the ordering information determined at the first and second vehicles (along with, in some embodiments, ordering information from other vehicles) is used to determine the order of vehicles in the consist. As discussed above, the information from various vehicles may be weighted or otherwise given preference to information from one or more other vehicles based on, for example, proximity to vehicles in question, or, as another example, signal quality metrics.

At 522, the consist is operated using the determined order. For example, commands for tractive or braking efforts may be tailored based on the position of vehicles in a consist. In some embodiments, a trip plan originally developed without knowing the position of individual vehicles in the consist is revised to fine-tune braking or tractive effort commands based on the position of vehicles in the consist. For example, braking efforts of vehicles toward the front of a consist may be increased over a portion or portions of a mission performed by the consist.

Embodiments may also include computer readable media with instructions that are configured to direct a processor to execute or perform the various method operations described herein. Embodiments may also include powered vehicles including the various modules and/or components or vehicle networks described herein. Moreover, embodiments described herein may include vehicle consists that include the various modules and/or components, the vehicle networks, or the system networks described herein.

In one embodiment, a system is provided that includes a first communication module and a first ordering determination module. The first communication module is configured to be disposed onboard a first vehicle of a vehicle consist and to communicate individual messages that are targeted for communication with respective individual second vehicles of the vehicle consist. The first ordering determination module is configured to be disposed onboard the first vehicle of the vehicle consist, and to determine an order of the first vehicle and one or more of the second vehicles in the consist using message characteristic information. The message characteristic information corresponds to one or more transmission characteristics of the individual messages.

In another aspect, the second vehicles include a second vehicle and a third vehicle. The system further includes second and third communication modules configured to be respectively disposed onboard the second vehicle and the third vehicle. The second and third communication modules are configured to communicate with one another via an individual path configured to communicatively couple the second and third communication modules. The system also includes second and third ordering determination modules configured to be respectively associated with the second and third communication modules and respectively disposed onboard the second vehicle and the third vehicle. The second and third ordering determination modules are configured to determine respective distance information for the second vehicle and the third vehicle on which the second and third ordering determination modules are configured to be disposed, respectively, using information corresponding to a characteristic of communication between the second and third communication modules over the individual path.

In another aspect, the message characteristic information includes communication rate information corresponding to rates of communication of the individual messages. In some embodiments, the communication rate information includes averaged communication rate information. In some embodiments, the individual messages comprise messages configured specifically for measuring rates of communication. In some embodiments, the first ordering determination module is configured to determine distance information corresponding to the relative distance of a given vehicle from the first vehicle based on the relative rates of plural of the individual messages, wherein a vehicle with which the first communication module communicates with at a faster rate is determined to be relatively nearer to the first vehicle than a vehicle with which the first communication module communicates with at a slower rate.

In another aspect, the first communication module is communicatively coupled to plural of the second vehicles via a multiple unit (MU) line. In some embodiments, the first communication module is configured to communicate with the plural of the second vehicles via Ethernet over multiple unit (eMU) using modulated signals overlayed on the MU line.

In another aspect, at least some of the individual messages are sent substantially simultaneously.

In another embodiment, a method (e.g., a method for determining the order of plural vehicles in a consist) is provided that includes sending, from a first communication module disposed onboard a first vehicle of a vehicle consist, plural first individual messages to corresponding plural second vehicles of the vehicle consist. The method also includes determining first message characteristic information corresponding to the second vehicles receiving the first individual messages. The method also includes determining, at an ordering determination module disposed onboard the first vehicle, a vehicle order of the consist using the first message characteristic information.

In another aspect, the method includes sending, from a second communication module disposed onboard one of the second vehicles of the vehicle consist, plural second individual messages to at least some of the other second vehicles or the first vehicle. The method may also include determining second message characteristic information corresponding to the at least some of the other second vehicles or the first vehicle receiving the second individual messages from the second communication module. The method may further include determining, at the one of the second vehicles, using the second message characteristic information, distance information corresponding to distances of the at least some of the other second vehicles or the first vehicle receiving the second individual messages from the second communication module, wherein the vehicle order of the consist is determined at the first vehicle using the distance information.

In another aspect, the first message characteristic information includes communication rate information corresponding to rates of communication of the first individual messages. In some embodiments, the communication rate information includes averaged communication rate information.

In another aspect, the method may further include configuring the individual messages specifically for measuring rates of communication.

In another aspect, the method may include sending the individual messages to the plural second vehicles via Ethernet over multiple unit (eMU) using modulated signals overlayed on a multiple unit (MU) line.

In another aspect, at least some of the plural first individual messages are sent substantially simultaneously.

In another embodiment, a tangible and non-transitory computer readable medium is provided that includes one or more computer software modules configured to direct a processor to send, from a first communication module disposed onboard a first vehicle of a vehicle consist, plural first individual messages to corresponding plural second vehicles of the vehicle consist. The one or more computer software modules are also configured to direct the processor to determine first message characteristic information corresponding to the second vehicles receiving the first individual messages. The one or more computer software modules are also configured to direct the processor to determine, at the first vehicle, a vehicle order of the consist using the first message characteristic information.

In another aspect, the one or more computer software modules are also configured to direct the processor to send, from a second communication module disposed onboard one of the second vehicles of the vehicle consist, plural second individual messages to at least some of the other second vehicles or the first vehicle, to determine second message characteristic information corresponding to the at least some of the other second vehicles or the first vehicle receiving the second individual messages from the second communication module, and to determine, at the one of the second vehicles, using the second message characteristic information, distance information corresponding to distances of the at least some of the other second vehicles or the first vehicle receiving the second individual messages from the second communication module. The processor is directed to determine, at the first vehicle, the vehicle order of the consist using the distance information.

In another aspect, the first message characteristic information includes communication rate information corresponding to rates of communication of the first individual messages. In some embodiments, the communication rate information includes averaged communication rate information.

In another aspect, the individual messages include messages configured specifically for measuring rates of communication.

In another aspect, at least some of the plural first individual messages are sent substantially simultaneously.

The various components (e.g., the router transceiver units) and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. The scope should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments, and also to enable any person skilled in the art to practice the embodiments, including making and using any devices or systems and performing any incorporated methods. The patentable scope is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A system comprising:
    a first communication module configured to be disposed onboard a first vehicle of a vehicle consist, the first communication module configured to communicate individual messages that are targeted for communication with respective individual second vehicles of the vehicle consist;
    a first ordering determination module configured to be disposed onboard the first vehicle of the vehicle consist, the first ordering determination module configured to determine an order of the first vehicle and one or more of the second vehicles in the consist using message characteristic information including at least one of: a time consumed by sending or receiving a message; or communication rate information corresponding to an amount of data transmitted over time of the individual messages; and
    a control module configured to operate the vehicle consist using the determined order;
    wherein the at least one of: a time consumed by sending or receiving a message; or communication rate information corresponding to an amount of data transmitted over time of the individual messages comprises the communication rate information corresponding to an amount of data transmitted over time of the individual messages,
    and wherein at least one of:
        the communication rate information corresponds to an amount of data transmitted over time of messages sent from the first vehicle to at least one of the second vehicles and an amount of data transmitted over time of messages sent from the at least one of the second vehicles to the first vehicle;
        the communication rate information includes averaged communication rate information;
        the individual messages comprise messages configured specifically for measuring the amount of data transmitted over time; or
        the first ordering determination module is configured to determine distance information corresponding to the relative distance of a given vehicle from the first vehicle based on the amount of data transmitted over time between the given vehicle and the first vehicle, wherein a vehicle with which the first communication module communicates a larger amount of data over time is determined to be relatively nearer to the first vehicle than a vehicle with which the first communication module communicates a smaller amount of data over time.

2. The system of claim 1, wherein the second vehicles comprise a second vehicle and a third vehicle, and the system further comprises:
    second and third communication modules configured to be respectively disposed onboard the second and third vehicles, the second and third communication modules configured to communicate with one another via an individual path configured to communicatively couple the second and third communication modules; and
    second and third ordering determination modules configured to be respectively associated with the second and third communication modules and respectively disposed onboard the second and third vehicles, wherein the second and third ordering determination modules are configured to determine respective distance information for the second and third vehicles on which the second and third ordering determination modules are configured to be disposed, respectively, using information including at least one of a signal to noise ratio, a time consumed by sending or receiving a message, or communication rate information corresponding to an amount of data transmitted over time between the second and third communication modules over the individual path.

3. The system of claim 2, wherein the first vehicle is a first rail vehicle, the second vehicle is a second rail vehicle, and the third vehicle is a third rail vehicle.

4. The system of claim 1, wherein the first communication module is communicatively coupled to plural of the second vehicles via a multiple unit (MU) line.

5. The system of claim 4, wherein the first communication module is configured to communicate with the plural of the second vehicles via Ethernet over multiple unit using modulated signals overlayed on the MU line.

6. The system of claim 5, wherein the first vehicle is a first rail vehicle and the one or more second vehicles are one or more second rail vehicles.

7. The system of claim 4, wherein the first vehicle is a first rail vehicle and the one or more second vehicles are one or more second rail vehicles.

8. The system of claim 1, wherein at least some of the individual messages are sent substantially simultaneously.

9. The system of claim 8, wherein the first vehicle is a first rail vehicle and the one or more second vehicles are one or more second rail vehicles.

10. The system of claim 1, wherein the first vehicle is a first rail vehicle and the one or more second vehicles are one or more second rail vehicles.

11. The system of claim 1, wherein the first vehicle is a first automobile and the one or more second vehicles are one or more second automobiles.

12. A method comprising:
    sending, from a first communication module disposed onboard a first vehicle of a vehicle consist, plural first individual messages to corresponding plural second vehicles of the vehicle consist;
    determining first message characteristic information including at least one of: a time consumed by sending or receiving a message; or communication rate information corresponding to an amount of data transmitted over time corresponding to the first individual messages;
    determining, at an ordering determination module disposed onboard the first vehicle, a vehicle order of the consist using the first message characteristic information; and
    controlling the vehicle consist using the determined order;

wherein the at least one of: a time consumed by sending or receiving a message; or communication rate information corresponding to an amount of data transmitted over time of the individual messages comprises the communication rate information corresponding to an amount of data transmitted over time of the individual messages, and wherein at least one of:

the communication rate information corresponds to an amount of data transmitted over time of messages sent from the first vehicle to at least one of the second vehicles and an amount of data transmitted over time of messages sent from the at least one of the second vehicles to the first vehicle;

the communication rate information includes averaged communication rate information; or the method further comprises configuring the individual messages specifically for measuring the amount of data transmitted over time.

13. The method of claim 12, further comprising:

sending, from a second communication module disposed onboard one of the second vehicles of the vehicle consist, plural second individual messages to at least some of the other second vehicles or the first vehicle;

determining second message characteristic information including at least one of a signal to noise ratio, a time consumed by sending or receiving a message, or communication rate information corresponding to an amount of data transmitted over time corresponding to the second individual messages; and determining, at said one of the second vehicles, using the second message characteristic information, distance information corresponding to distances of said at least some of the other second vehicles or the first vehicle receiving the second individual messages from the second communication module;

wherein the vehicle order of the consist is determined at the first vehicle using the distance information.

14. The method of claim 12, further comprising sending the individual messages to the plural second vehicles via Ethernet over multiple unit using modulated signals overlayed on a multiple unit line.

15. The method of claim 14, wherein the first vehicle is a first rail vehicle and the second vehicles are second rail vehicles.

16. The method of claim 12, wherein at least some of the plural first individual messages are sent substantially simultaneously.

17. The method of claim 16, wherein the first vehicle is a first rail vehicle and the second vehicles are second rail vehicles.

18. The method of claim 12, wherein the first vehicle is a first rail vehicle and the second vehicles are second rail vehicles.

19. The method of claim 12, wherein the first vehicle is a first automobile and the second vehicles are second automobiles.

20. A tangible and non-transitory computer readable medium comprising one or more computer software modules configured to direct a processor to:

send, from a first communication module disposed onboard a first vehicle of a vehicle consist, plural first individual messages to corresponding plural second vehicles of the vehicle consist;

determine first message characteristic information including at least one of: a time consumed by sending or receiving a message; or communication rate information corresponding to an amount of data transmitted over time corresponding to the first individual messages;

determine, at the first vehicle, a vehicle order of the consist using the first message characteristic information; and control the vehicle consist using the determined order;

wherein the at least one of: a time consumed by sending or receiving a message; or communication rate information corresponding to an amount of data transmitted over time of the individual messages comprises the communication rate information corresponding to an amount of data transmitted over time of the individual messages, and wherein at least one of:

the communication rate information corresponds to an amount of data transmitted over time of messages sent from the first vehicle to at least one of the second vehicles and an amount of data transmitted over time of messages sent from the at least one of the second vehicles to the first vehicle;

the communication rate information includes averaged communication rate information; or the first individual messages comprise messages configured specifically for measuring the amount of data transmitted over time.

21. The computer readable medium of claim 20, wherein the computer readable medium is further configured to direct the processor to:

send, from a second communication module disposed onboard one of the second vehicles of the vehicle consist, plural second individual messages to at least some of the other second vehicles or the first vehicle;

determine second message characteristic information including at least one of a signal to noise ratio, a time consumed by sending or receiving a message, or communication rate information corresponding to an amount of data transmitted over time corresponding to the second individual messages; and determine, at said one of the second vehicles, using the second message characteristic information, distance information corresponding to distances of said at least some of the other second vehicles or the first vehicle receiving the second individual messages from the second communication module;

wherein the processor is directed to determine, at the first vehicle, the vehicle order of the consist using the distance information.

22. The computer readable medium of claim 20, wherein at least some of the plural first individual messages are sent substantially simultaneously.

* * * * *